United States Patent
Wu et al.

(10) Patent No.: US 11,494,150 B2
(45) Date of Patent: Nov. 8, 2022

(54) DUAL DISPLAY REGIONS CONTROL METHOD AND DUAL DISPLAY REGIONS CONTROL SYSTEM

(71) Applicants: BenQ Intelligent Technology (Shanghai) Co., Ltd, Shanghai (CN); BENQ CORPORATION, Taipei (TW)

(72) Inventors: Chen-Chi Wu, Taipei (TW); Chin-Fu Chiang, Taipei (TW); Chia-Nan Shih, Taipei (TW); Lin-Yuan You, Taipei (TW); Chuang-Wei Wu, Taipei (TW); Jung-Kun Tseng, Taipei (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 59 days.

(21) Appl. No.: 17/322,931

(22) Filed: May 18, 2021

(65) Prior Publication Data
US 2021/0373835 A1 Dec. 2, 2021

(30) Foreign Application Priority Data
May 29, 2020 (CN) .......................... 202010473546.4

(51) Int. Cl.
| G06F 3/14 | (2006.01) |
| H04W 76/10 | (2018.01) |
| G09G 5/14 | (2006.01) |
| H04N 5/38 | (2006.01) |
| H04N 5/44 | (2011.01) |

(52) U.S. Cl.
CPC ............. *G06F 3/1423* (2013.01); *G09G 5/14* (2013.01); *H04N 5/38* (2013.01); *H04N 5/44* (2013.01); *H04W 76/10* (2018.02)

(58) Field of Classification Search
CPC .... G06F 3/1423; G06F 1/1647; G06F 3/1462; G09G 5/14
See application file for complete search history.

(56) References Cited

U.S. PATENT DOCUMENTS

| 10,496,356 B2 * | 12/2019 | Yoshida .................. G06F 3/147 |
| 2003/0098819 A1 | 5/2003 | Sukthankar |
| 2009/0141171 A1 * | 6/2009 | Wu ........................ H04N 7/142 |
| | | 348/554 |

(Continued)

FOREIGN PATENT DOCUMENTS

| EP | 2 023 630 A2 | 2/2009 |
| EP | 2 023 630 A3 | 12/2010 |

*Primary Examiner* — Kevin M Nguyen
(74) *Attorney, Agent, or Firm* — Winston Hsu

(57) ABSTRACT

A dual display regions control method includes establishing a link between a receiver and a first transmitter and a link between the receiver and a second transmitter, transmitting a first image signal to the first transmitter after the first transmitter is triggered, transmitting the first image signal to the receiver, transmitting a second image signal to the second transmitter after the second transmitter is triggered, transmitting the second image signal to the receiver, selecting the first transmitter from the first transmitter and the second transmitter, displaying the first image signal on a first display region through the receiver after the first transmitter is selected, and displaying identification data of the first transmitter and the second transmitter on a second display region through the receiver.

22 Claims, 6 Drawing Sheets

(56) References Cited

U.S. PATENT DOCUMENTS

2011/0090970 A1     4/2011   Kim
2013/0083156 A1     4/2013   Forkner
2015/0035938 A1*    2/2015   Emori ................. H04L 12/1827
                                                              348/14.08
2015/0277844 A1    10/2015   Kubota

* cited by examiner

DUAL DISPLAY REGIONS CONTROL METHOD AND DUAL DISPLAY REGIONS CONTROL SYSTEM

BACKGROUND OF THE INVENTION

1. Field of the Invention

The present invention relates to a dual display regions control method and a dual display regions control system, and more particularly, a dual display regions control method and a dual display regions control system capable of displaying image contents and a member list.

2. Description of the Prior Art

With the rapid development of science and technology, various projector systems and conference reporting systems have been adopted in our daily life. The conference report system can be integrated with a projector system for increasing the operational convenience of a presenter when data is presented. Currently, the conference reporting systems use wireless or wired communications for transmitting data to a display device. The data communications methods can be categorized into two modes. In a first mode, specific software has to be installed in computers operated by members participating in a conference meeting. The computer can identify several hardware components such as a hard disk, a universal serial bus (USB), and a CD-ROM device. Then, data saved in previously mentioned physical or virtual storage devices can be transmitted to a screen or display device through a wireless network. In a second mode, the computers operated by the members participating in the conference meeting can be linked to transmitters. The transmitters are linked to the screen or display device through a receiver. Therefore, after the computers are linked to transmitters, the data of the computer can be displayed on the screen or display device through the receiver. In recent years, the conference reporting systems can use wireless communications technologies for increasing operational efficiency.

Further, for a moderator, it is a very important issue to control timing of presenting report contents of the meeting members in real-time. The moderator has to switch images of the report contents of different meeting members in real-time. If the moderator smoothly controls a meeting process, discussion efficiency of the meeting can be improved. However, in current meeting system, it lacks a highly intuitive control interface. Therefore, the moderator is hard to efficiently control projected data (i.e., such as projecting, displaying, or switching pages of meeting report contents for at least one meeting member).

SUMMARY OF THE INVENTION

In an embodiment of the present invention, a dual display regions control method is disclosed. The method includes establishing a first link between a receiver and a first transmitter and a second link between the receiver and a second transmitter, pairing the receiver with the first transmitter and the second transmitter for accessing data through the first link and the second link, transmitting a first image signal from a first image signal source to the first transmitter after the first transmitter is triggered, processing the first image signal by the first transmitter for transmitting the first image signal to the receiver, transmitting a second image signal from a second image signal source to the second transmitter after the second transmitter is triggered, processing the second image signal by the second transmitter for transmitting the second image signal to the receiver, identifying the first transmitter and the second transmitter, selecting the first transmitter from the first transmitter and the second transmitter, displaying the first image signal transmitted from the first transmitter on a first display region after the first transmitter is selected, and displaying identification information of the first transmitter and the second transmitter on a second display region.

In another embodiment of the present invention, a dual display regions control system is disclosed. The system comprises a first image signal source, a second image signal source, a first transmitter, a second transmitter, a receiver, and at least one display. The first image signal source is configured to generate the first image signal. The second image signal source is configured to generate the second image signal. The first transmitter is coupled to the first image signal source. The second transmitter is coupled to the second image signal source. The receiver is linked to the first transmitter and the second transmitter and configured to receive the first image signal and the second image signal. The at least one display is linked to the receiver and configured to provide two display regions. After a first link between the receiver and the first transmitter and a second link between the receiver and the second transmitter are established, the receiver pairs with the first transmitter and the second transmitter for accessing data through the first link and the second link. The first image signal source transmits the first image signal to the first transmitter after the first transmitter is triggered. The first transmitter processes the first image signal for transmitting the first image signal to the receiver. The second image signal source transmits the second image signal to the second transmitter after the second transmitter is triggered. The second transmitter processes the second image signal for transmitting the second image signal to the receiver. The receiver identifies the first transmitter and the second transmitter. The receiver selects the first transmitter from the first transmitter and the second transmitter. The first image signal transmitted from the first transmitter is displayed on a first display region of the at least one display after the first transmitter is selected. Identification information of the first transmitter and the second transmitter is displayed on a second display region of the at least one display.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
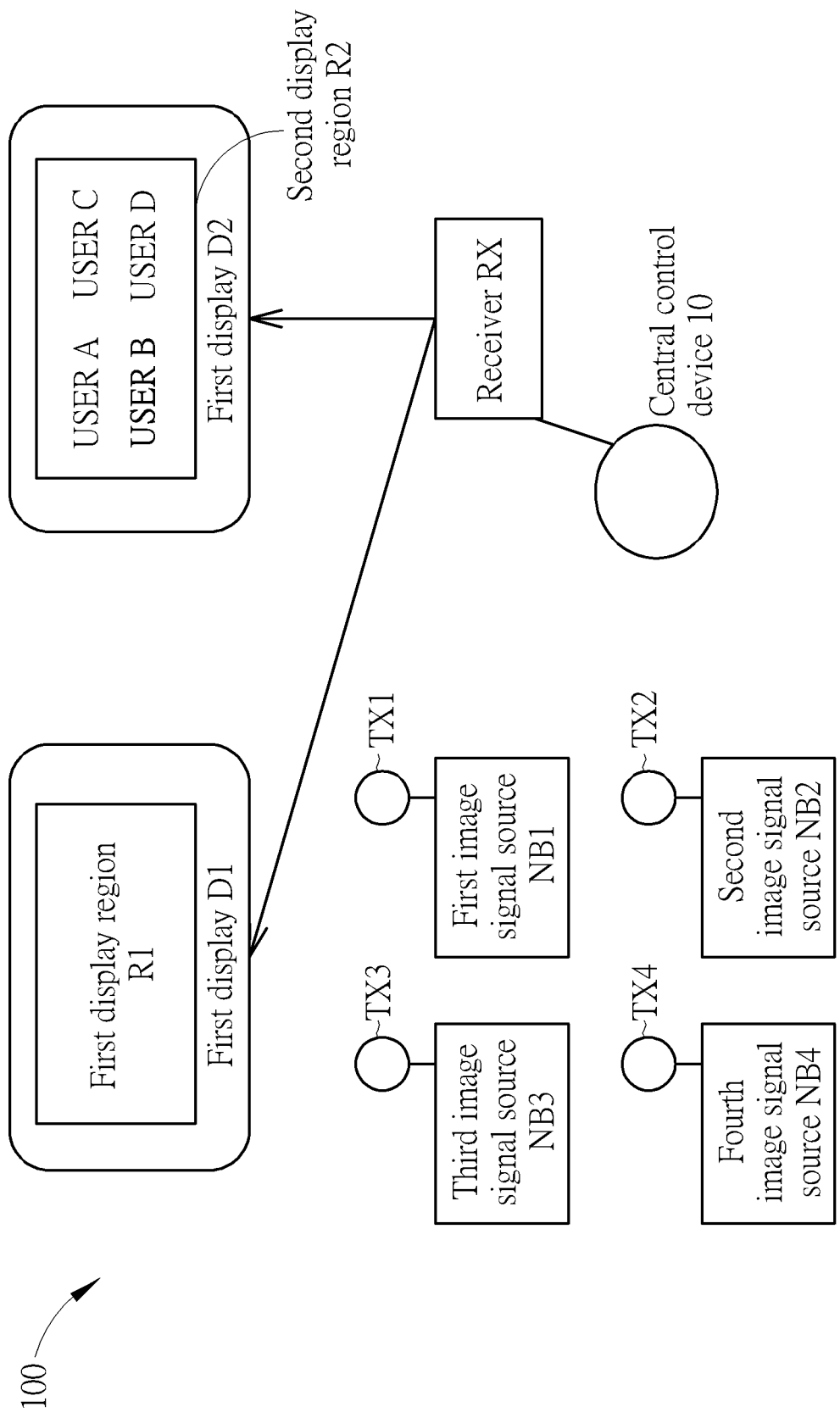
FIG. 1 is a block diagram of a dual display regions control system according to an embodiment of the present invention.

FIG. 1 is a block diagram of a dual display regions control system 100 according to an embodiment of the present invention. The dual display regions control system 100 includes a first image signal source NB1, a second image signal source NB2, a third image signal source NB3, a fourth image signal source NB4, a first transmitter TX1, a second transmitter TX2, a third transmitter TX3, a fourth transmitter TX4, a receiver RX, a first display D1, and a second display D2. Particularly, the number of image signal sources, the number of transmitters, and the number of displays of the dual display regions control system 100 are not limited by FIG. 1. In FIG. 1, the first image signal source NB1, the second image signal source NB2, the third image signal source NB3, and the fourth image signal source NB4 can be communication devices, such as desktop computers, notebooks, or tablets for generating image signals. The first transmitter TX1 is coupled to the first image signal source NB1. The second transmitter TX2 is coupled to the second image signal source NB2. The third transmitter TX3 is coupled to the third image signal source NB3. The fourth transmitter TX4 is coupled to the fourth image signal source NB4. The first transmitter TX1, the second transmitter TX2, the third transmitter TX3, and the fourth transmitter TX4 can be coupled to corresponding image signal sources by using hot-plugging ports. The receiver RX is wirelessly linked to the first transmitter TX1, the second transmitter TX2, the third transmitter TX3, and the fourth transmitter TX4 for receiving image signals transmitted from the first transmitter TX1, the second transmitter TX2, the third transmitter TX3, and the fourth transmitter TX4. Further, the receiver RX can also select one transmitter from these transmitters. For example, the moderator can operate a central control device 10 linked to the receiver RX for selecting the first transmitter TX1. At least one display is linked to the receiver RX for providing two display regions. For example, the dual display regions control system 100 can include the first display D1 and the second display D2. The first display D1 is used for displaying the first display region R1. The second display D2 is used for displaying the second display region R2. The first display region R1 can display reporting contents of the meeting, such as text contents or image contents. The second display region R2 can display a member list of the meeting, such as a list of users operating the first transmitter TX1, the second transmitter TX2, the third transmitter TX3, and the fourth transmitter TX4 (i.e., as shown in USER A to USER D). In the dual display regions control system 100, any reasonable technical change or hardware modification falls into the scope of the present invention. For example, the dual display regions control system 100 can introduce Q transmitters and Q image signal sources. Q can be any positive integer greater than one. The dual display region control system 100 can also introduce a single display for displaying the first display region R1 and the second display region R2 by using two split-screens. However, for simplicity, the first transmitter TX1 and the second transmitter TX2 are illustrated later.

In the dual display regions control system 100, after a first link between the receiver RX and the first transmitter TX1 and a second link between the receiver RX and the second transmitter TX2 are established, the receiver RX can pair with the first transmitter TX1 and the second transmitter TX2 for accessing data through the first link and the second link. The first image signal source NB1 can transmit a first image signal to the first transmitter TX1 after the first transmitter TX1 is triggered (i.e., by using a hotkey or a timer). The first transmitter TX1 can process the first image signal for transmitting the first image signal to the receiver RX. Similarly, the second image signal source NB2 can transmit the second image signal to the second transmitter TX2 after the second transmitter TX2 is triggered (i.e., by using a hotkey or a timer). The second transmitter TX2 can process the second image signal for transmitting the second image signal to the receiver RX. The receiver RX identifies the first transmitter TX1 and the second transmitter TX2 for selecting a transmitter (i.e., such as the first transmitter TX1) from two transmitters TX1 and TX2. The first image signal transmitted from the first transmitter TX1 can be displayed on the first display region R1 after the first transmitter TX1 is selected. The first image signal can include data contents generated by the first image signal source NB1. Therefore, the first display region R1 can display the data contents generated by the first image signal source NB1. Further, identification information of the first transmitter TX1 and the second transmitter TX2 can be displayed on the second display region R2.

In the dual display regions control system 100, the receiver RX has to identify the first transmitter TX1 and the second transmitter TX2. Therefore, an image signal source of the received image signal can be accurately identified. Further, a specific transmitter can be controlled by the receiver RX. The receiver RX can use different modes for identifying the first transmitter TX1 and the second transmitter TX2, as illustrated below. In a first mode, after the first transmitter TX1 and the second transmitter TX2 are linked to the first image data source NB1 and the second image data source NB2 respectively, the first transmitter TX1 and the second transmitter TX2 can transmit identification information to the receiver RX automatically. Therefore, the receiver RX can identify the first transmitter TX1 and the second transmitter TX2 according to the identification information. The identification information can be any message used for distinguishing the first transmitter TX1 and the second transmitter TX2. For example, the identification information can include specific image information, user personal image information, hardware user names, communication software accounts, and/or email user names. If the first image signal source NB1 and the second image signal source NB2 are two notebooks, a screen image of the first image signal source NB1 and a screen image of the second image signal source NB2 can be displayed as two sub-images on the display D1 or D2 according to the identification information. In a second mode, the receiver RX can transmit a request signal to the first transmitter TX1 and the second transmitter TX2. After the first transmitter TX1 and the second transmitter TX2 receive the request signal, the first transmitter TX1 and the second transmitter TX2 can transmit the identification information of the first image signal source NB1 and the second image signal source NB2 to receiver RX. In the third mode, the receiver RX can set the first transmitter TX1 and the second transmitter TX2 for generating different identification characteristics displayed on the first transmitter TX1 and the second transmitter TX2. For example, the first transmitter TX1 and the second transmitter TX2 have light-emitting diodes (LEDs). For example, the receiver RX can set the LED of the first transmitter TX1 to emit red light, and set the LED of the second transmitter TX2 to emit blue light. Further, the identification characteristics (i.e., such as different LED colors) emitted from the first transmitter TX1 and the second transmitter TX2 correspond to the identification information of the first transmitter TX1 and the second transmitter TX2 displayed on the second display region R2. For example, in FIG. 1, the second display region R2 displayed on the second display D2 includes the member list. If the LED of the first transmitter TX1 is set to emit the red light, a text of "USER A" in the member list can be displayed as a red color text. If the LED of the second transmitter TX2 is set to emit the blue light, a text of "USER B" in the member list can be displayed as a blue color text. In a fourth mode, the receiver RX can control two identification images displayed on the first image signal source NB1 and the second image signal source NB2 through the first transmitter TX1 and the second transmitter TX2. For example, if the first image signal source NB1 and the second image signal source NB2 are two notebooks, the receiver RX can operate the first transmitter TX1 and the second transmitter TX2 for controlling the first image signal source NB1 and the second image signal source NB2 to display the designated images. Further, the identification characteristics displayed on the first transmitter TX1 and the second transmitter TX2 correspond to identification information of the first transmitter TX1 and the second transmitter TX2 displayed on the second display region R2. For example, the receiver RX can control the screen of the first image signal source NB1 for displaying a brand of manufacturer A through the first transmitter TX1. The receiver RX can control the screen of the second image signal source NB2 for displaying a brand of manufacturer B through the second transmitter TX2. Then, the second display region R2 displayed on the second display D2 can include the information of the member list. The member list can also introduce images of different trademarks for identifying all members. Any reasonable modification falls into the scope of the present invention.

Figure 2A:
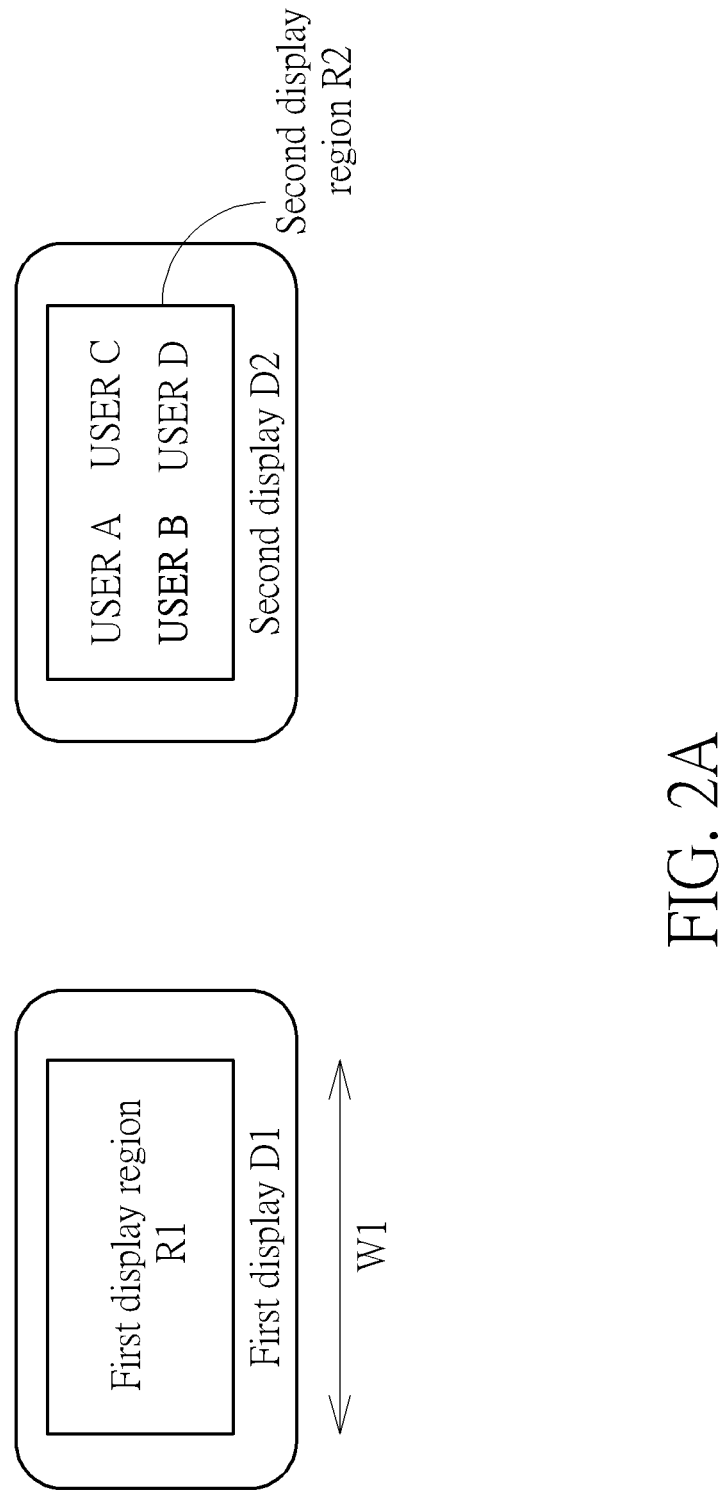
FIG. 2A is a first display region and a second display region displayed on two displays under a first mode of the dual display regions control system in FIG. 1.
Figure 2B:
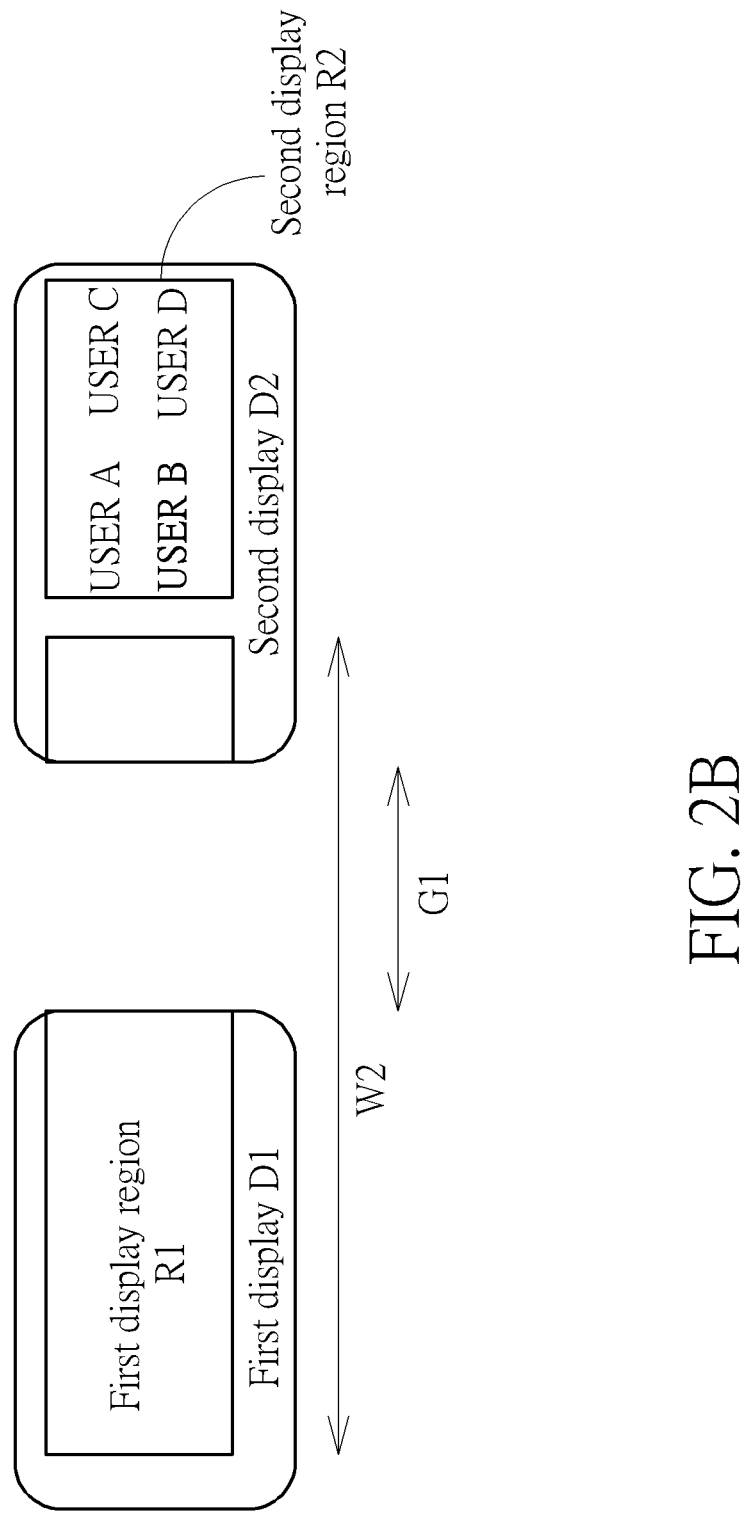
FIG. 2B is the first display region and the second display region displayed on two displays under a second mode of the dual display regions control system in FIG. 1.
Figure 2C:
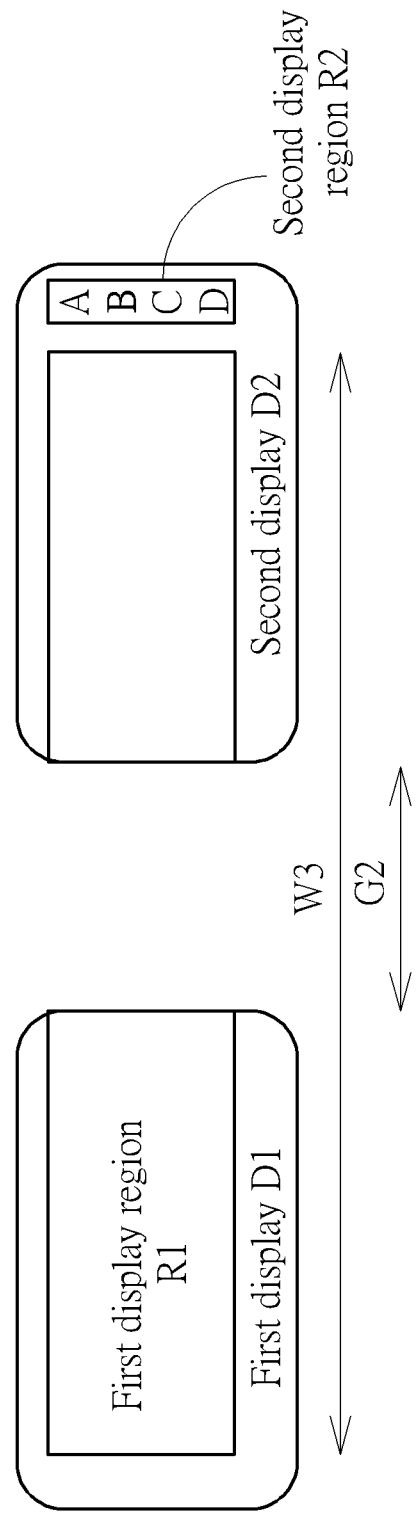
FIG. 2C is the first display region and the second display region displayed on two displays under a third mode of the dual display regions control system in FIG. 1.

FIG. 2A is the first display region R1 and the second display region R2 displayed on two displays under a first mode of the dual display regions control system 100. FIG. 2B is the first display region R1 and the second display region R2 displayed on two displays under a second mode of the dual display regions control system 100. FIG. 2C is the first display region R1 and the second display region R2 displayed on two displays under a third mode of the dual display regions control system 100. As previously mentioned, the dual display regions control system 100 has a first display region R1 and a second display region R2. Sizes of the first display region R1 and the second display region R2 can be customized. The display mode of the first display region R1 and the second display region R2 can also be a dual-display with a dual-screen display mode, a dual-display with a cross-screen display mode, or a single-display with split screens display mode, as illustrated below. In FIG. 2A, the first display D1 has the first display region R1. The second display D2 has the second display region R2. Therefore, a width W1 of the first display region R1 may be the image width supported by the first display D1. Further, the first display region R1 can display dynamic meeting content images (i.e., such as a video format). The second display region R2 can display static member list data (i.e., such as a text format). Therefore, an image resolution of the first display region R1 is higher than an image resolution of the second display region R2 for enhancing visual experience. In FIG. 2B, the first display region R1 includes a display region of the first display D1 and a part of display region of the second display D2. When an interval distance between the first display D1 and the second display D2 is G1, a width of the first display region R1 is equal to W2–G1. The display mode in FIG. 2B can be regarded as the dual-display with a dual-screen display mode. In FIG. 2C, the first display region R1 includes the display region of the first display D1 and most of display region of the second display D2. When an interval distance between the first display D1 and the second display D2 is G2, a width of the first display region R1 is equal to W3–G2. The display mode in FIG. 2C can also be regarded as the dual-display with a cross-screen display mode. However, in FIG. 2C, in order to maximize a range of the first display region R1, the dual display regions control system 100 can minimize a range of the second display region R2. By doing so, the range of the first display region R1 can be enlarged when the data contents are presented under the cross-screen display mode for the dual displays. Further, a width W3 of the second display region R2 can approach a full-screen width of the two displays (D1 and D2).

Further, in the dual display regions control system 100, the receiver RX is capable of selecting another transmitter for displaying images in real-time, and capable of dynamically adjusting the member list. For example, after the receiver RX selects the first transmitter TX1, the first image signal transmitted from the first transmitter TX1 can be displayed on the first display region R1 through the receiver RX. Further, the receiver RX can label an identification characteristic of the first transmitter TX1 currently selected on the second display region R2, such as displayed in form of highlighted texts or images, bold texts, or images having different colors. Then, the receiver RX can select the second transmitter TX2 from the first transmitter TX1 and the second transmitter TX2. After the second transmitter TX2 is selected, the receiver RX can display the second image data transmitted from the second transmitter TX2 on the first display region R1 for updating the first display region R1. Similarly, the receiver RX can label an identification characteristic of the second transmitter TX2 currently selected on the second display region R2. In other words, the receiver RX can dynamically change the contents displayed on the first display region R1, and can also dynamically change the member list and labeling contents displayed on the second display region R2. Further, as shown in FIG. 1, the receiver RX can also be operated by the central control device 10. For example, the moderator can operate a central control device 10 for controlling the receiver RX to select at least one transmitter. Therefore, the image signal of the at least one transmitter can be displayed on the first display region R1 through the receiver RX. Further, the identification information of the first transmitter TX1 and the second transmitter TX2 can include a projection list information and/or identification characteristics information of the first transmitter TX1 and the second transmitter TX2. As previously mentioned, the contents of the identification information displayed on the second display region R2 can include member list information, as presented in form of a text format. The contents of the identification information displayed on the second display region R2 may also include identification characteristics (i.e., such as some trademarks, some patterns with different colors, and/or some photo information), as presented in form of an image format. Any reasonable technology modification falls into the scope of the present invention.

Further, the dual display regions control system 100 can also introduce a touch operation mode for controlling contents displayed on the first display region R1 and the second display region R2, as illustrated below. When the first image data source NB1 and the second image data source NB2 are two notebooks, the identification information can include a first identification characteristic and a second identification characteristic. The first identification characteristic and the second identification characteristic can be two different patterns or two touch regions displayed on different positions. In other words, the first identification characteristic can be displayed on a first position of the second display region R2. The second identification characteristic can be displayed on a second position of the second display region R2. The first position is different from the second position. When the first position is triggered by a first triggering event (for example, the user touches the first position of the second display region R2), the receiver RX can generate a first notification signal to the first transmitter TX1. Then, the first image signal transmitted from the first transmitter TX1 can be displayed on the first display region R1 through the receiver RX. Similarly, When the second position is triggered by a second triggering event (for example, the user touches the second position of the second display region R2), the receiver RX can generate a second notification signal to the second transmitter TX2. Then, the second image signal transmitted from the second transmitter TX2 can be displayed on the first display region R1 through the receiver RX.

In the dual display regions control system 100, when a transmitter is unselected by the receiver RX, the receiver RX can control a display device to display a default image on the first display region R1. After the central control device 10 controls the receiver RX for selecting a certain transmitter, the receiver RX can immediately switch the default image displayed on the first display region R1 to the image transmitted from the selected transmitter. The receiver RX can also generate a signal to the central control device 10 after an image switching process is complete. Then, the central control device 10 can display an indication message associating with an image switching process completion status. Further, the transmitter in the dual display regions control system 100 can be regarded as a virtual display device, as illustrated below. For example, the first transmitter TX1 can transmit first extended display identification data (EDID) to a first data processing device of the first image signal source NB1 when the first transmitter TX1 is coupled to the first image signal source NB1. After the first data processing device receives the first EDID, the first data processing device can identify the first transmitter TX1 as a first virtual display device according to the first EDID. Similarly, the second transmitter TX2 can transmit second EDID to a second data processing device of the second image signal source NB2 when the second transmitter TX2 is coupled to the second image signal source NB2. After the second data processing device receives the second EDID, the second data processing device can identify the second transmitter TX2 as a second virtual display device according to the second EDID.

Figure 3A:
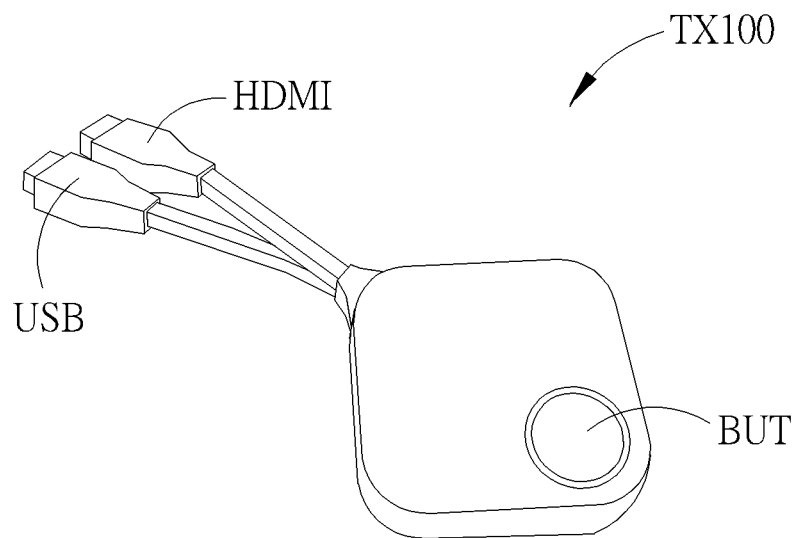
FIG. 3A is an illustration of a first appearance of a transmitter in the dual display regions control system in FIG. 1.
Figure 3B:
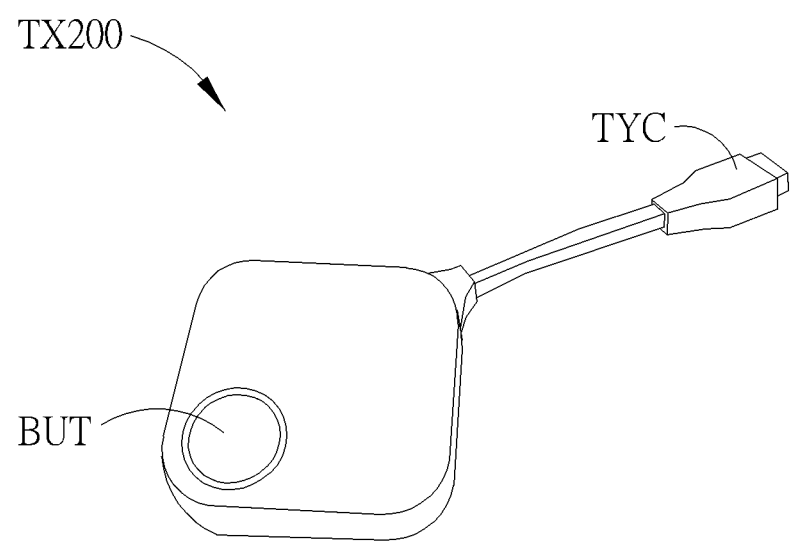
FIG. 3B is an illustration of a second appearance of a transmitter in the dual display regions control system in FIG. 1.

FIG. 3A is an illustration of a first appearance of a transmitter in the dual display regions control system 100. FIG. 3B is an illustration of a second appearance of a transmitter in the dual display regions control system 100. To avoid ambiguity, the transmitter in FIG. 3A is denoted as a transmitter TX100 hereafter. The transmitter in FIG. 3B is denoted as a transmitter TX200 hereafter. As shown in FIG. 3A and FIG. 3B, the transmitter TX100 and the transmitter TX200 have buttons BUT. The button BUT can also be regarded as a control button for triggering to transmit the image signal to the receiver RX. For example, after the transmitter TX100 is paired with the receiver RX for establishing a link, when the user presses the button BUT of the transmitter TX100, the transmitter TX100 can transmit the image signal to the receiver RX. The receiver RX can control the first display D1 and/or the second display D2 for displaying images according to the image signal. Further, as previously mentioned, the transmitter can be linked to a corresponding image signal source (i.e., such as a notebook). Therefore, the transmitter can include at least one data transmission port. For example, the transmitter TX100 can use the USB Type-A transmission port USB and/or the High Definition Multimedia Interface (HDMI) transmission port HDMI for linking to the corresponding image signal source. Further, the transmitter TX200 can be linked to the corresponding image signal source by using a C-type universal serial bus (USB Type-C) transmission port TYC. However, embodiments of the present invention are not limited to signal formats. Any reasonable hardware modification such as a cable length, a transmission port specification, or a device appearance design falls into the scope of the present invention.

Figure 4:
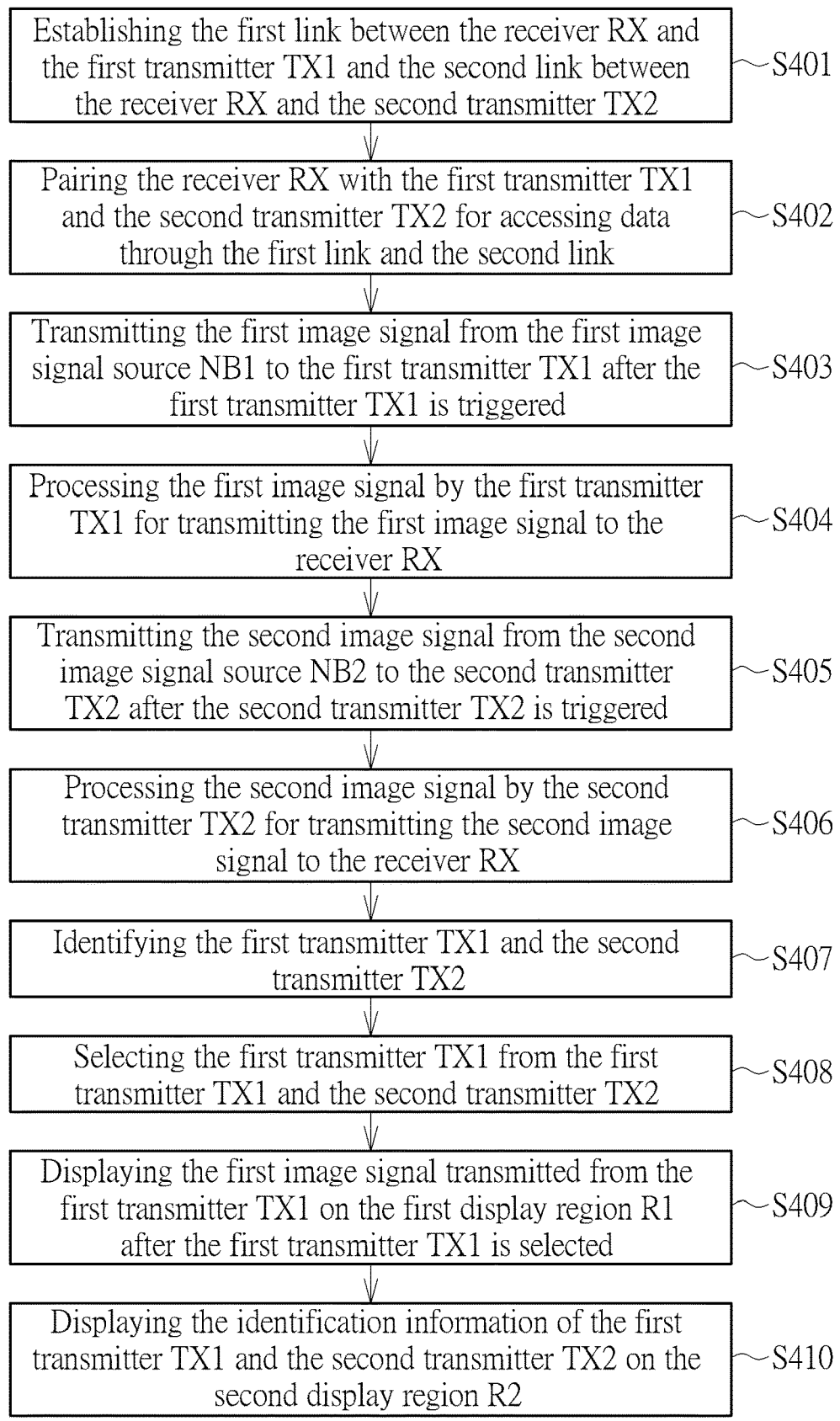
FIG. 4 is a flow chart of performing a dual display regions control method by the dual display regions control system in FIG. 1.

FIG. 4 is a flow chart of performing a dual display regions control method by the dual display regions control system 100. The dual display regions control method includes step S401 to step S410. Any reasonable technology modification falls into the scope of the present invention. Step S401 to step S410 are illustrated below.

Step S401: establishing the first link between the receiver RX and the first transmitter TX1 and the second link between the receiver RX and the second transmitter TX2;

Step S402: pairing the receiver RX with the first transmitter TX1 and the second transmitter TX2 for accessing data through the first link and the second link;

Step S403: transmitting the first image signal from the first image signal source NB1 to the first transmitter TX1 after the first transmitter TX1 is triggered;

Step S404: processing the first image signal by the first transmitter TX1 for transmitting the first image signal to the receiver RX;

Step S405: transmitting the second image signal from the second image signal source NB2 to the second transmitter TX2 after the second transmitter TX2 is triggered;

Step S406: processing the second image signal by the second transmitter TX2 for transmitting the second image signal to the receiver RX;

Step S407: identifying the first transmitter TX1 and the second transmitter TX2;

Step S408: selecting the first transmitter TX1 from the first transmitter TX1 and the second transmitter TX2;

Step S409: displaying the first image signal transmitted from the first transmitter TX1 on the first display region R1 after the first transmitter TX1 is selected;

Step S410: displaying the identification information of the first transmitter TX1 and the second transmitter TX2 on the second display region R2.

Details of step S401 to step S410 are previously illustrated. Therefore, they are omitted here. In the dual display regions control system 100, since the receiver RX can selectively display the image signal transmitted from at least one transmitter on a display region, operability can be increased for the conference moderator. Further, the dual display regions control system 100 can use two display regions (R1 and R2) for clearly and synchronously displaying the conference contents transmitted from the transmitter in conjunction with the member list of the meeting. Therefore, the moderator can intuitively and efficiently control or switch the displayed data contents of the meeting.

To sum up, the present invention illustrates a dual display regions control system and a dual display regions control method. The dual display regions control system can control two display regions at the same time. One display region is used for displaying data contents corresponding to a currently selected transmitter. Another display region is used for displaying the member list of the meeting. Therefore, the conference moderator can intuitively and efficiently control a meeting process and operate data contents presented by the current reporter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dual display regions control method comprising:
    establishing a first link between a receiver and a first transmitter and a second link between the receiver and a second transmitter;
    pairing the receiver with the first transmitter and the second transmitter for accessing data through the first link and the second link;
    transmitting a first image signal from a first image signal source to the first transmitter after the first transmitter is triggered;
    processing the first image signal by the first transmitter for transmitting the first image signal to the receiver;
    transmitting a second image signal from a second image signal source to the second transmitter after the second transmitter is triggered;
    processing the second image signal by the second transmitter for transmitting the second image signal to the receiver;
    identifying the first transmitter and the second transmitter;
    selecting the first transmitter from the first transmitter and the second transmitter;
    displaying the first image signal transmitted from the first transmitter on a first display region after the first transmitter is selected; and
    displaying identification information of the first transmitter and the second transmitter on a second display region.

2. The method of claim 1, further comprising:
    automatically generating the identification information by the first transmitter and the second transmitter to the receiver for identifying the first transmitter and the second transmitter by the receiver according to the identification information.

3. The method of claim 1, wherein the identification information corresponds to two sub-images of two displayed images transmitted from the first image signal source and the second image signal source.

4. The method of claim 1, further comprising:
    transmitting a request signal from the receiver to the first transmitter and the second transmitter; and
    transmitting identification information of the first image signal source and the second image signal source to the receiver through the first transmitter and the second transmitter.

5. The method of claim 4, wherein the identification information comprises a hardware user name, a communication software account, and/or an email user name corresponding to the first image signal source and the second image signal source.

6. The method of claim 1, further comprising:
    setting the first transmitter and the second transmitter by the receiver for generating different identification characteristics displayed on the first transmitter and the second transmitter;
    wherein the identification characteristics displayed on the first transmitter and the second transmitter correspond to identification information of the first transmitter and the second transmitter displayed on the second display region.

7. The method of claim 1, further comprising:
    controlling two identification images displayed on the first image signal source and the second image signal source by the receiver through the first transmitter and the second transmitter;
    wherein the two identification images displayed on the first image signal source and the second image signal source correspond to identification information of the first transmitter and the second transmitter displayed on the second display region.

8. The method of claim 1, wherein a first display has the first display region, a second display has the second display region, and an image resolution of the first display region is higher than an image resolution of the second display region.

9. The method of claim 1, wherein the first display region comprises a display region of a first display and part of a display region of a second display, or the first display region and the second display region are two split-screens of a single display.

10. The method of claim 1, further comprising:
    selecting the second transmitter from the first transmitter and the second transmitter; and
    displaying the second image signal transmitted from the second transmitter on the first display region for updating the first display region after the second transmitter is selected.

11. The method of claim 1, wherein the identification information of the first transmitter and the second transmitter comprises a projection list information and/or identification characteristics information of the first transmitter and the second transmitter, and selecting the first transmitter from the first transmitter and the second transmitter is using a central control device to control the receiver to select the first transmitter.

12. The method of claim 1, further comprising:
    labeling an identification characteristic of the first transmitter currently selected by the receiver on the second display region.

13. The method of claim 1, wherein the identification information comprises a first identification characteristic and a second identification characteristic, the first identification characteristic is displayed on a first position of the second display region, the second identification characteristic is displayed on a second position of the second display region, when the first position is triggered by a first triggering event, the receiver generates a first notification signal to the first transmitter, the first image signal transmitted from the first transmitter through the receiver is displayed on the first display region, and when the second position is triggered by a second triggering event, the receiver generates a second notification signal to the second transmitter, the second image signal transmitted from the second transmitter through the receiver is displayed on the second display region.

14. The method of claim 1, further comprising:
transmitting first extended display identification data (EDID) from the first transmitter to a first data processing device of the first image signal source when the first transmitter is coupled to the first image signal source;
identifying the first transmitter as a first virtual display device by the first data processing device according to the first EDID after the first data processing device receives the first EDID;
transmitting second EDID from the second transmitter to a second data processing device of the second image signal source when the second transmitter is coupled to the second image signal source; and
identifying the second transmitter as a second virtual display device by the second data processing device according to the second EDID after the second data processing device receives the second EDID.

15. A dual display regions control system comprising:
a first image signal source configured to generate the first image signal;
a second image signal source configured to generate the second image signal;
a first transmitter coupled to the first image signal source;
a second transmitter coupled to the second image signal source;
a receiver linked to the first transmitter and the second transmitter and configured to receive the first image signal and the second image signal; and
at least one display linked to the receiver and configured to provide two display regions;
wherein after a first link between the receiver and the first transmitter and a second link between the receiver and the second transmitter are established, the receiver pairs with the first transmitter and the second transmitter for accessing data through the first link and the second link, the first image signal source transmits the first image signal to the first transmitter after the first transmitter is triggered, the first transmitter processes the first image signal for transmitting the first image signal to the receiver, the second image signal source transmits the second image signal to the second transmitter after the second transmitter is triggered, the second transmitter processes the second image signal for transmitting the second image signal to the receiver, the receiver identifies the first transmitter and the second transmitter, the receiver selects the first transmitter from the first transmitter and the second transmitter, the first image signal transmitted from the first transmitter is displayed on a first display region of the at least one display after the first transmitter is selected, and identification information of the first transmitter and the second transmitter is displayed on a second display region of the at least one display.

16. The system of claim 15, wherein the receiver transmits a request signal to the first transmitter and the second transmitter, and the first image signal source and the second image signal source transmit identification information to the receiver.

17. The system of claim 15, wherein the receiver sets the first transmitter and the second transmitter for generating different identification characteristics displayed on the first transmitter and the second transmitter, and the identification characteristics displayed on the first transmitter and the second transmitter correspond to identification information of the first transmitter and the second transmitter displayed on the second display region.

18. The system of claim 15, wherein the receiver controls two identification images displayed on the first image signal source and the second image signal source through the first transmitter and the second transmitter, and the two identification images displayed on the first image signal source and the second image signal source correspond to identification information of the first transmitter and the second transmitter displayed on the second display region.

19. The system of claim 15, wherein a first display has the first display region, a second display has the second display region, and an image resolution of the first display region is higher than an image resolution of the second display region.

20. The system of claim 15, wherein the first display region comprises a display region of a first display and part of a display region of a second display, or the first display region and the second display region are two split-screens of a single display.

21. The system of claim 15, wherein the receiver selects the second transmitter from the first transmitter and the second transmitter, and after the second transmitter is selected, the second image signal transmitted from the second transmitter is displayed on the first display region for updating the first display region.

22. The system of claim 15, further comprising:
a central control device coupled to the receiver and configured to control the receiver for selecting the first transmitter;
wherein the identification information of the first transmitter and the second transmitter comprises a projection list information and/or identification characteristics information of the first transmitter and the second transmitter, and the receiver labels an identification characteristic of the first transmitter currently selected on the second display region.

* * * * *